United States Patent [19]
Abbott

[11] Patent Number: 5,860,140
[45] Date of Patent: Jan. 12, 1999

[54] CIRCUIT AND METHOD FOR LEARNING ATTRIBUTES OF COMPUTER MEMORY

[75] Inventor: Gary W. Abbott, Austin, Tex.

[73] Assignee: Dell U.S.A., L.P., Round Rock, Tex.

[21] Appl. No.: 698,821

[22] Filed: Aug. 16, 1996

Related U.S. Application Data

[63] Continuation of Ser. No. 199,370, Feb. 17, 1994, abandoned.
[51] Int. Cl.$^6$ ........................................ G06F 12/02
[52] U.S. Cl. .............................. 711/202; 711/203
[58] Field of Search ..................... 711/202, 203, 711/154, 156, 141, 142

[56] References Cited

U.S. PATENT DOCUMENTS 5,091,846  2/1992  Sachs et al. ........................... 395/250
5,353,431  10/1994  Doyle et al. ........................... 395/481

*Primary Examiner*—Jack A. Lane
*Attorney, Agent, or Firm*—Haynes and Boone, L.L.P.

[57] ABSTRACT

Disclosed are a circuit and method for learning attributes of computer memory (such as cacheability and writability) in a computer system. The circuit is coupled to a central processing unit ("CPU") and memory units within the computer system. The circuit is capable of retrieving an attribute relating to performance or operation of a particular memory unit when the CPU accesses the particular memory unit and storing the attribute in random-access memory ("RAM") within the circuit, subsequent accesses by the CPU of the memory unit made more efficient by use of the stored attribute. Operation of the circuit is transparent to the CPU and the memory unit. In an alternative embodiment, the circuit is within the CPU itself.

34 Claims, 3 Drawing Sheets

CIRCUIT AND METHOD FOR LEARNING ATTRIBUTES OF COMPUTER MEMORY

This is a continuation of application Ser. No. 08/199,370 filed Feb. 17, 1994 now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed in general to memory management and mapping in a computer and, more specifically, to a circuit proximate to a processor in the computer capable of learning the entire memory map of the computer.

BACKGROUND OF THE INVENTION

Efficient and effective memory management is central to the design of any computer system. Memory management schemes vary from a primitive bare-machine approach to paging and segmentation strategies, with each approach having its own advantages and disadvantages.

By far, the simplest memory management scheme is none at all. The user is simply presented with the bare machine and has complete control over the entire memory space. Such a system provides maximum flexibility to the user, for the user can control the use of memory in whatever manner desired. There is no need for special hardware, nor is there a need for operating system software.

Clearly, the bare machine approach is not appropriate in today's personal computer ("PC") market where the user wishes to flip a switch and begin processing, not at all interested in programming the system or tracking a data path. In today's computer systems and, in particular, in PCs, addressable memory space comprises memory units having different attributes, or performance characteristics.

In some PCs, certain memory addresses are permanently allocated with specific attributes. In these systems, most typically the lowest 640 kilobytes is attributed as cacheable, read-writable random access memory ("RAM"), the next 384 kilobytes is attributed as read-only memory ("ROM") and the remaining addressable space above the megabyte is attributed as non-cacheable, read-writable RAM. To perform an access in these systems, the microprocessor central processing unit ("CPU") makes a request of a memory subsystem. The memory subsystem decodes the address and carries out the request with the knowledge stored in a hard-wired memory attribute map within the memory subsystem. A memory attribute map contains data pertaining to the operating characteristics of the memory in the computer. The hard-wired memory attribute map allows the CPU to make optimal use of the memory by allowing the CPU to adapt its access of the memory as a function of the memory's attributes. Unfortunately, since the memory attribute map is hard-wired and therefore immutable, the memory configuration of the system itself is immutable, restricting the versatility and adaptability of the system to new memory arrangements and technologies.

There are a number of ways to overcome the disadvantages of a hard-wired memory attribute maps. First, the memory subsystem itself could be redesigned to accommodate memory units having different attributes. This is not desirable, however, because it renders obsolete memory subsystem hardware already in existence.

A second solution is to modify existing memory management driver software so that the software has knowledge of the system and the programming features to thereby enable the software to deal with changes in the memory. This solution, as the last, requires software modification, rendering obsolete the available base of driver software.

All of the above-discussed alternatives suffer from a common ailment: they are relatively inflexible, either with respect to memory configuration changes within the system itself or with respect to accommodation of existing hardware and software. Accordingly, what is needed in the art are a circuit and method for accommodating memory attribute changes that are transparent to the remainder of the computer system so as to operate in existing systems.

SUMMARY OF THE INVENTION

To address the above-discussed deficiencies of the prior art, it is a primary object of the present invention to provide a circuit and method by which to learn dynamically the attributes of memory units within the memory subsystem as the CPU accesses the memory units. The circuit should be transparent to the CPU and the memory units.

In the attainment of the above-noted primary object, the present invention is a computer system comprising (1) a CPU, (2) a memory unit, coupled to the CPU, having a particular attribute and (3) a mapping circuit, coupled to the CPU and the memory unit, capable of retrieving the attribute when the CPU accesses the memory unit and storing the attribute in the mapping circuit, subsequent accesses by the CPU of the memory unit optimized by use of the stored attribute. In a preferred embodiment of the present invention, RAM is provided within the circuit for storing the attribute.

Another object of the present invention is to place as little dependency on other hardware within the computer system. Accordingly, the present invention provides that the mapping RAM be static RAM so as to eliminate a need to refresh the mapping RAM.

In a preferred embodiment of the present invention, the circuit reestablishes (or relearns) the attribute every time the computer boots or reboots. This allows a user to make changes to the memory configuration and restart the system, confident that the changes will be reflected in a new memory attribute map. Accordingly, the present invention provides a reset circuit for booting the computer system, the reset circuit erasing the attribute from the mapping circuit when the computer system is booted to thereby allow the mapping circuit to dynamically learn the attribute while the computer system functions.

A preferred embodiment of the present invention provides a transparent means of making use of the attribute that has been stored in the mapping RAM. Accordingly, the present invention, in its preferred embodiment, makes use of a write buffer coupled to the CPU and the memory unit, the write buffer retrieving the attribute from the mapping circuit when the CPU again accesses the memory unit, the write buffer using the attribute to increase efficiency of communication of data between the CPU and the memory unit. The write buffer lies logically between the CPU and the memory unit and senses when it is appropriate to actually write to the memory unit as a function of the attribute of the memory unit. The write buffer is given as an example of a way in which the attributes stored in the mapping circuit can be employed in a computer system to advantage. The write buffer, however, need not be employed to take full advantage of the present invention, as attributes can be used in other, similarly advantageous ways.

One alternative embodiment of the present invention places the mapping circuit and its mapping RAM within the CPU itself (on the same chip) which, while no longer maintaining transparency with respect to operation of the CPU, allows more freedom and flexibility in the way the CPU uses the mapping circuit to optimize memory access.

Another object of the present invention is to allow the mapping RAM to generalize somewhat concerning the attributes of a particular memory unit. In other words, it is deemed safe to assume that a particular memory unit will possess similar attributes for all addressable locations within the memory unit. Thus, the mapping RAM need not waste space by storing an attribute for every memory location (a one-to-one correspondence). In the present invention, the attribute corresponds to a memory unit of a predetermined minimum size. In the disclosed embodiment, that predetermined minimum size is 16 kilobytes (16K), meaning that it is assumed that the smallest memory unit is 16K large. This allows the mapping RAM to be 16K times smaller than the memory it represents, resulting in a relatively compact design. In the disclosed embodiment, the 14 least significant address lines are ignored, thereby giving the circuit a resolution of 16K.

It is an object of the present invention to store particular attributes concerning a memory unit. In its preferred embodiment, the present invention stores attributes pertaining to at least the cacheability, writability and writethrough capability of the memory unit. Although these attributes will be explained in more detail later, at this point it is sufficient to point out that cacheability is the ability of a particular memory unit to be mapped into cache memory; the CPU is able to communicate with the memory unit through cache memory. Writability is simply the capacity of a memory unit to receive, as well as give, information. ROM is not writable, by definition. RAM is writable. Writethrough is a way the memory unit deals with cache memory if it is cacheable. Writeback is the alternative of writethrough. A more detailed discussion of writethrough and writeback is outside of the scope of the present invention. It should be obvious to those ordinarily skilled in the art that other attributes may be just as desirable to store in the mapping RAM and that the future may bring still other attributes of interest.

The present invention starts with a clean slate every time the computer is booted or rebooted. All memory is initially assumed to be noncacheable, nonwritable and writethrough and the mapping RAM reflects this fact. As the mapping circuit learns otherwise through successive memory accesses on behalf of the CPU, the mapping RAM will reflect this knowledge gained, and the system responds by operating more efficiently with respect to its memory management by tailoring its access as a function of the attributes. For instance, the CPU will not attempt to write to ROM and will allow caching of cacheable memory.

In the attainment of the above-discussed objects and features, the preferred embodiment of the present invention also encompasses a method of operating a computer system comprising the steps of (1) addressing a location within a memory unit with a CPU, the memory unit having a particular attribute relating to operation of the memory unit, (2) establishing a path for communication of data between the CPU and the location with a memory controller, the memory controller developing a signal representing the attribute, (3) receiving the attribute into a memory-mapping circuit coupled to the memory controller, (4) storing the attribute in an attribute map within the memory-mapping circuit, the attribute map becoming more complete as the CPU addresses other memory units within the computer system, (5) retrieving the attribute from the attribute map into a write buffer when the CPU again addresses the memory unit, the write buffer using the attribute to increase efficiency of communication between the CPU and the memory unit independent of operation of the CPU and memory unit and (6) erasing the attribute map when the computer system is booted to thereby allow the memory-mapping circuit to dynamically learn the attribute map while the computer system functions.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
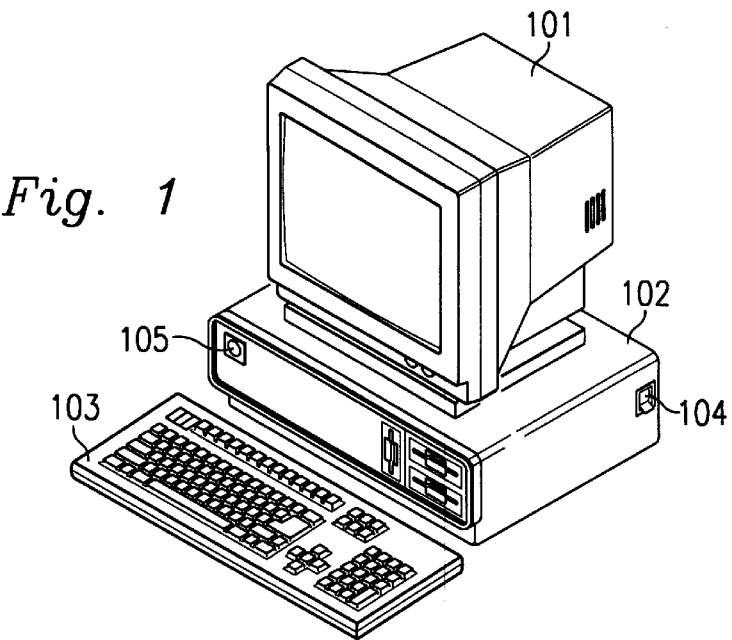
FIG. 1 illustrates an isometric view of a PC.

FIG. 1 illustrates an isometric view of a personal computer ("PC") embodying the present invention. The PC comprises a main chassis 102 coupled to a monitor 101 and a keyboard 103. As has been introduced previously and will be discussed in greater detail with reference to FIG. 2, the present invention is activated and initialized when the PC receives a reset signal. This reset signal may be initiated in one of three ways, namely, activation of a reset switch 105 on the chassis 102, through a power surge or interruption (not shown) or turning on via a power switch 104.

Figure 2:
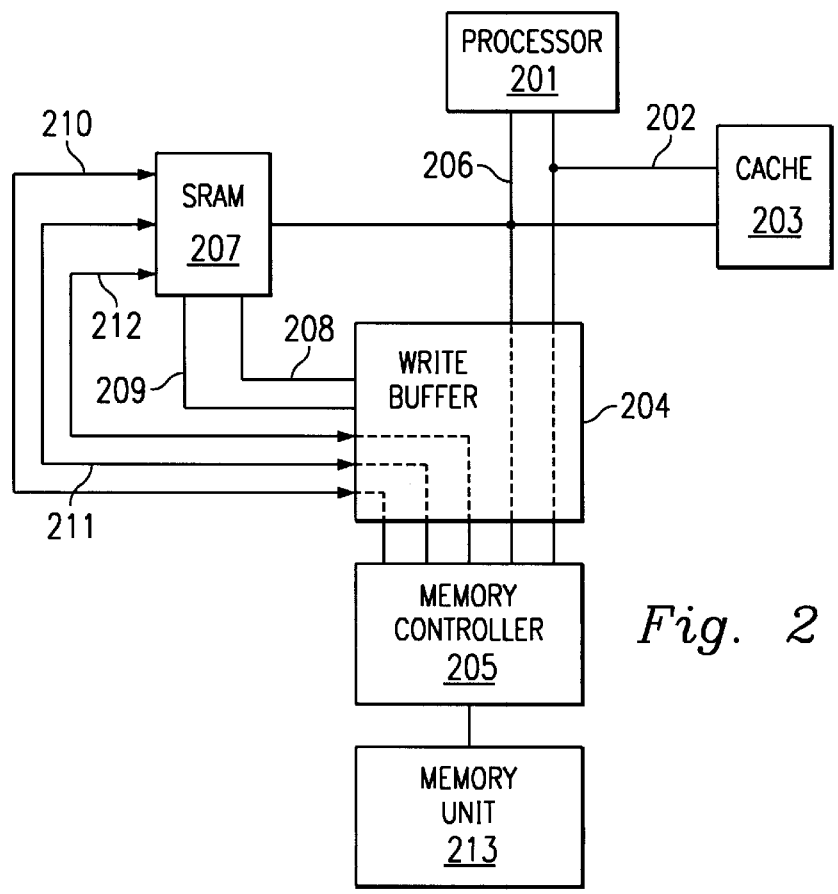
FIG. 2 illustrates a block diagram of the architecture of the PC of FIG. 1 embodying the present invention.

Turning now to FIG. 2 illustrated is a block diagram of the architecture of the PC of FIG. 1 embodying the present invention. In a preferred embodiment, a CPU 201 is coupled to a write buffer 204 via an address bus 206 and a data bus 202. Both the address bus 206 and the data bus 202 are elements of a host bus (not shown) that is capable of transmitting address and data signals at a relatively high speed between the CPU 201 and other circuits proximate to the CPU 201. A cache memory 203 and a SRAM 207 are also coupled to the address bus 206. The cache memory 203 is further coupled to the data bus 202.

The SRAM 207 is also coupled to the write buffer 204 via a number of pin-out lines, namely, a read line 208, a write line 209, a cacheability indicator line 210, a write protect indicator line 211, and a writeback indicator line 212. The lines 210, 211, 212 are bidirectional to allow attributes to be both written to and read from the SRAM 207. As is clearly illustrated in FIG. 2, the cacheability indicator line 210, the write protect indicator line 211 and the writeback indicator line 212 pass to the write buffer 204, as indicated by the broken lines, coupling the write buffer 204 to a memory controller 205. The write buffer 204 is further coupled to the memory controller 205 via the data bus 202 and the address bus 206. Those skilled in the art will recognize that it is conventional for memory controllers to provide an indication of the attributes of the memory controlled. The purpose of the SRAM 207 is to provide a mapping circuit or mapping RAM, the mapping RAM storing attributes pertaining to writability and cacheability, among others, generated by memory controllers in the system.

The purpose of the write buffer 204 is to hold data that the CPU 201 intends to be written to memory units via the memory controller 205. The write buffer 204 receives attributes from the mapping circuit comprising the SRAM 207 and the indicator lines 210, 211, 212 and alters communication between the CPU 201 and the memory controller 205 as a function of what it learns from the mapping circuit. For instance, if the write buffer 204 learns that a particular memory unit is nonwritable, it will simply refuse to write to that memory unit, even if the CPU 201 instructs a write to be performed. Also, if the write buffer 204 receives a command to write to a memory unit that is determined to be writeback cacheable, the write buffer 204 holds the data to be written until a time during which it can be conveniently written. If, in the intervening time, the CPU 201 orders another write to the same location, the write buffer 204 will simply hold the new data in place of the previously-held data, updating the memory unit only once, giving rise to increased memory management efficiency. Attached hereto as Appendix "A"is a source code listing in the well-known ABLE VHSIC design language that, when compiled in a conventional manner, is used to program programmable logic arrays ("PALs") to cooperate with conventional buffer memory to act as a write buffer or store queue and to transmit signals to the SRAM 207 corresponding to memory attributes in accordance with the present invention. Definitions of the pertinent input and output lines are highlighted. The equations that refer to one or more of the pertinent input or output lines are therefore relevant to the present invention.

It is important to note that the write buffer 204 provides only one of many ways to use the attributes stored within the SRAM 207 to advantage. If it is desirable to involve the CPU 201 in the attribute process, the CPU 201 itself can receive the attributes from the SRAM 207 and make decisions regarding memory management. If an equivalent of the SRAM 207 (the mapping circuit) is located in the CPU 201, this arrangement becomes even more attractive. In the alternative, some other control circuitry can make use of the attributes. The important aspect of the present invention is the operation of the mapping circuit itself and the fact that its operation is transparent to the remainder of the computer system.

In a preferred embodiment of the present invention, the CPU 201 receives a reset signal, as discussed in conjunction with FIG. 1, which instructs the CPU 201 to boot. The reset signal is also received by the SRAM 207 causing the SRAM 207 to clear or initialize in a conventional manner, which enables the SRAM 207 to enter into a safe state, wherein the SRAM 207 assumes noncacheability, writability and writethrough for all of the memory.

It is important to note that the mapping circuit depicted in FIG. 2 need not be outside and proximate to the CPU 201. The circuit could be located internally within the CPU 201 chip itself. Furthermore, the functionality performed by this circuit may be used by the central processing unit of a computer as well as co-processors and dedicated controllers.

Figure 3:
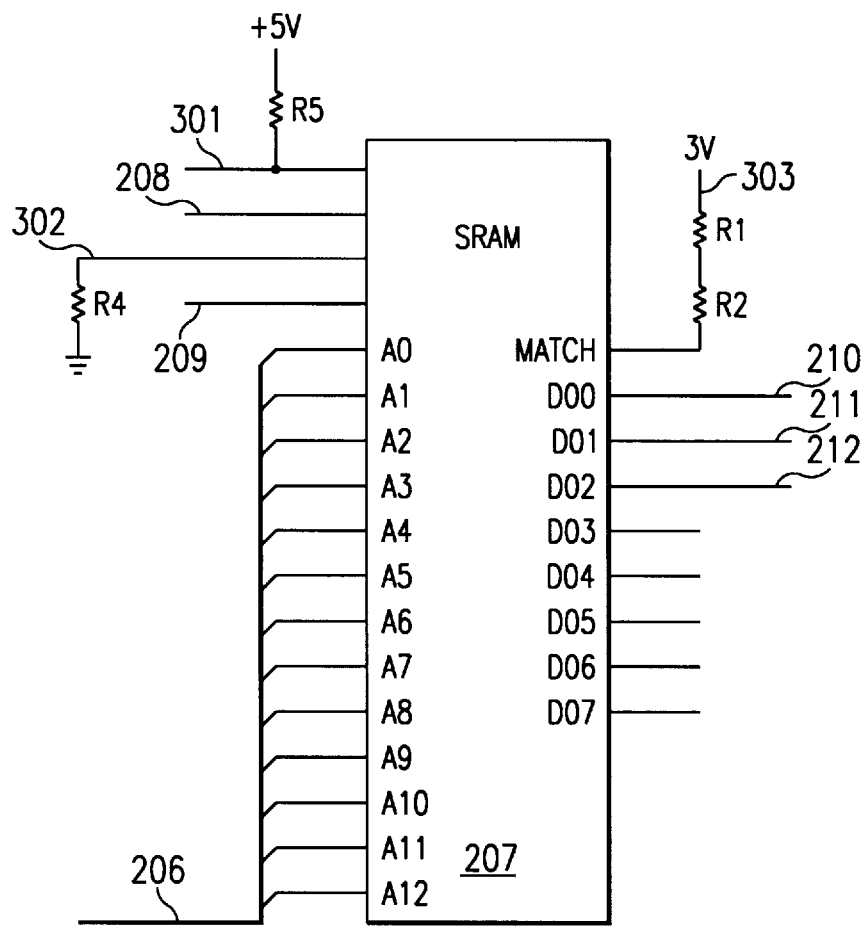
FIG. 3 illustrates a block diagram more particularly detailing commercially-available static random access memory ("SRAM") employable as a mapping RAM in the present invention.

Turning now to FIG. 3, illustrated is a block diagram more particularly detailing the SRAM 207. In its preferred embodiment, the present invention is able to use a standard, commercially-available flash resettable SRAM, such as part no. IDT7165 by Integrated Device Technology, Inc. The SRAM should be resettable to enable the SRAM to be flushed of its stored attributes when the system is reset.

As shown in FIG. 3, a pin-out line 301 is brought high by a 5 volt voltage source tied in series with a resistor R5, enabling the write buffer 204 to issue the reset signal discussed in conjunction with FIG. 2. A line 302 is brought low through a resistor R4 to allow the SRAM to be written to and therefore always receive attributes. A line 303 is not used in the present invention and is therefore brought high through resistors R1 and R2 in series.

Address lines A0 through A12 are tied to the 13 most significant bits of address bus 206 (lines A14 through A26). It should be recalled that, since the SRAM assumes a minimum memory unit size of 16K, the lowest 16K's worth of address lines (lines A0 through A13) are ignored. This, of course is a design decision and through use of wider or cascading SRAMs, increased resolution can be had.

Data lines D00 through D02 are used for attributes as described with reference to FIG. 2. Data lines D03 through D07 are left uncoupled and are reserved for future attributes. Those skilled in the art should realize that a wider SRAM or cascaded SRAMs can allow storage of even more attributes.

Figure 4:
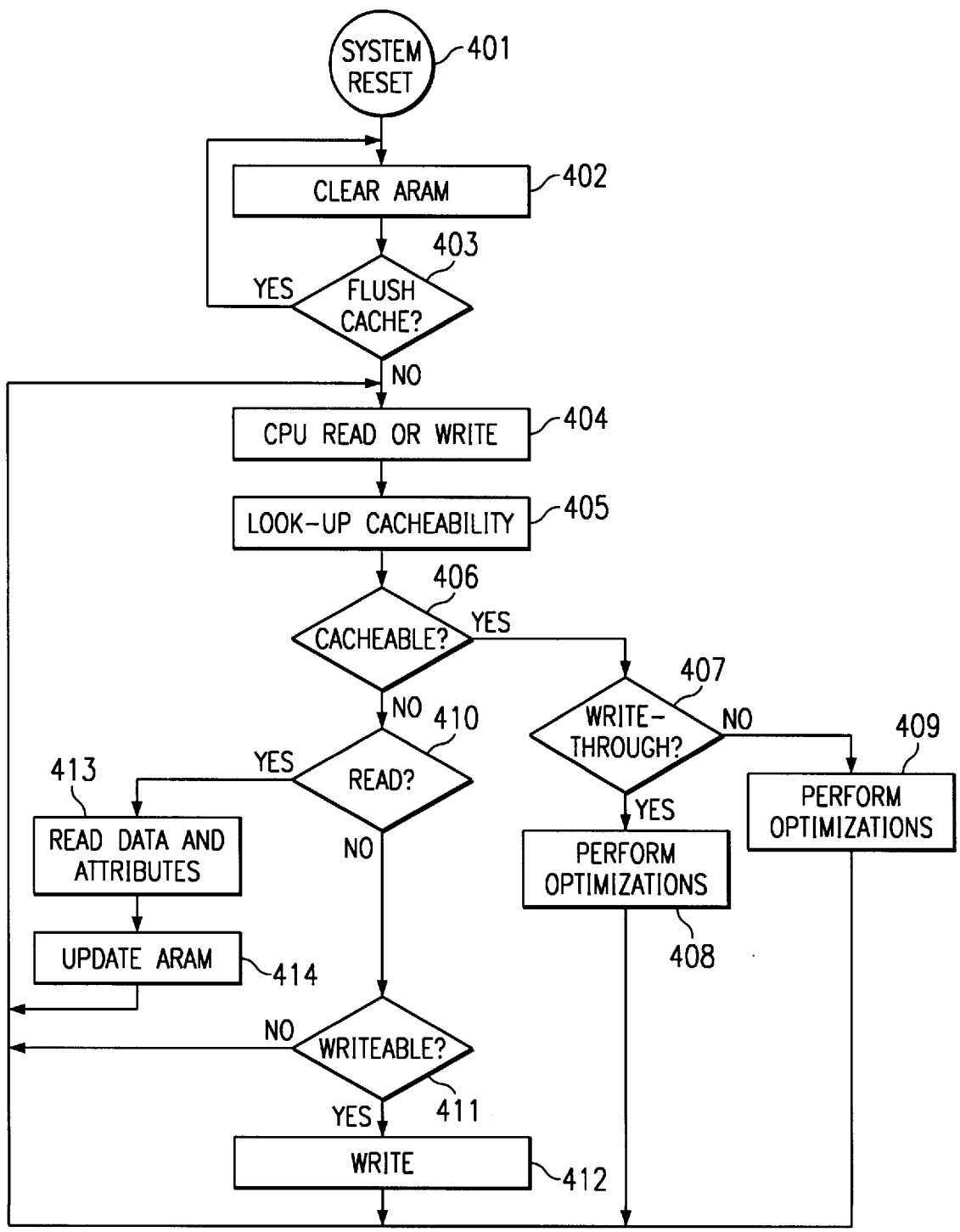
FIG. 4 illustrates a flow diagram of the method of the present invention as carried out in the architecture of FIG. 2.

Turning now to FIG. 4, illustrated is a flow diagram of the method of the present invention carried out in architecture of FIG. 2. Upon receipt of a reset enabling signal (in a step 401) from one of the three sources discussed in conjunction with FIG. 1, the CPU 201 and the SRAM ("ARAM") 207 are initialized (in a step 402), causing the CPU 201 to begin to boot and the SRAM to be cleared of attributes. Initialization of the SRAM 207 simply means that its attributes are reset to non-cacheability, nonwritability and writethrough which, given the nature of SRAM initialization (wherein reset zeros SRAM addressable space), means that those attributes are best represented by zeros.

When the CPU 201 boots, a determination is made whether or not to flush the cache 203 (in a step 403). If the cache 203 is to be flushed, then the SRAM 207 must again be reset following the flush to ensure that the SRAM 207 contains no false attributes. Execution proceeds to step 404.

During operation, the CPU 201 performs a memory access (a read or write) in a step 404. The write buffer 204 looks up whether the memory at the address to be accessed is cacheable (in a step 405). Execution branches (in a step 406) depending upon whether that location is cacheable. If so, the write buffer 204 looks up whether the location is writeback or writethrough cacheable (in a step 407). If the location is writethrough, conventional optimizations such as byte combining, write posting and read-around are performed (in a step 408). Otherwise, conventional optimizations applicable to writeback caching are performed (in a step 409). In either case, execution returns to the step 404 pending another access.

If the location is not cacheable, then a determination is made as to whether the access is a read or a write (in a step 410). If the access is a write, the write buffer looks up whether the location is writable (in a step 411). If the location is not writable, the write is not made to occur (it being inefficient to write to a read-only location) and execution returns to the step 404. If the location is writable, the write is performed (in a step 412) and execution returns to the step 404 pending another access.

If the access is a read, execution proceeds from the step 410 to a step 413, in which the data from the location and attributes pertaining to the location are read from the memory controller 205. The SRAM 207 is updated with the attributes in a step 414 and execution returns to the step 404 pending another access.

From the above, it is apparent that the present invention provides a computer system comprising: (1) a CPU, (2) a memory unit, coupled to the CPU, having a particular attribute and (3) a mapping circuit, coupled to the CPU and the memory unit, capable of retrieving the attribute when the CPU accesses the memory unit and storing the attribute in the mapping circuit, subsequent accesses by the CPU of the memory unit optimized by use of the stored attribute.

Although the present invention and its advantages have been described in detail, those skilled in the art should understand that various changes, substitutions and alterations can be made herein without departing from the spirit and scope of the invention as defined by the appended claims.

APPENDIX "A"

```
"  CBLAST, U11, 7451, 20R4-5
"          Revision History
"
"  03-18-93 JLU BLOCK HOLD WITH LOCK_
5  03-06-93 JLU BELUMAN
"  02-03-93 JLU BLOCK BLAST WITH CACHE_
"  01-20-93 JLU FIX POK_
"  01-08-93 JLU CA IN CFILL INSTEAD CKEN
"  01-07-93 JLU ADD PHASE TO CA TO PREVENT METASTABLE
10 12-22-92 JLU SWITCH TO POK_
"  12-15-92 JLU MOVE WR, PHASE, LOCK
"  12-12-92 JLU MOVE WBWR, WR_ TO WR, SWITCH RESET TO POK
"  12-05-92 JLU ADD CFILL
"  03-18-92 DBOUVIER:INITIAL DESIGN

15 MODULE CBLAST
   TITLE 'BURST LAST GENERATOR PAL 3-18-92'

"Description

"THIS PAL GENERATES THE LAST BURST (BLAST) SIGNAL FOR THE SECONDARY
   "CACHE CONTROL LOGIC DURING READ HITS AND FILLS DURING MISSES

20         "Declarations

"Define Device
   CBLAST       device 'P20R4';
```

-1-

APPENDIX "A"

"Define Inputs"

| | | | |
|---|---|---|---|
| CLKCPU | pin 1; | "(2) | 66 MHz CLOCK INPUT |
| RSTCPU | pin 2; | "(3) | RSTCPU PIN TO TRI-STATE NON Q OUTPUTS |
| HHOLD | pin 3; | "(4) | SYSTEM HOLD REQUEST |
| SLOWH_ | pin 4; | "(5) | NOT USED |
| CKEN_ | pin 5; | "(6) | KEN SIGNAL FROM TRANE |
| FLUSHBIT | pin 6; | "(7) | NOT USED |
| T2 | pin 7; | "(9) | PROCESSOR 2nd T-STATE |
| CA | pin 8; | "(10) | CACHABLE ADDRESS |
| 1CACHE_ | pin 9; | "(11) | PROC CACHEABLE CYCLE |
| BRDY_ | pin 10; | "(12) | PROCESSOR BURST READY |
| BOFF_ | pin 11; | "(13) | PROC BACKOFF |
| TEST | pin 13; | "(16) | REGISTER OE |
| WR | pin 14; | "(17) | CPU WR |
| 1LOCK_ | pin 15; | "(18) | CPU LOCK CYCLE |
| PHASE | pin 16; | "(19) | LOW CLK33 |
| SPARE | pin 23; | "(27) | SPARE |
| | | | |
| GND | pin 12; | "(14) | GND PIN |

"Define Outputs"

| | | | |
|---|---|---|---|
| 2HOLD | pin 17; | "(20) | COMBINED HOLD REQUEST |
| BLAST_ | pin 18; | "(21) | BURST LAST |
| STBLST2 | pin 19; | "(23) | STATE BIT 2 |
| STBLST1 | pin 20; | "(24) | STATE BIT 1 |
| XXX | pin 21; | "(25) | SPARE |
| 2SFILL | pin 22; | "(26) | CACHE LINE FILL |

-2-

APPENDIX "A"

```
VCC         pin 24;  "(28) VCC PIN
```

APPENDIX "A"

"Define Constants"

H,L,X,Z,C,T,F    =    1,0,.X.,.Z.,.C.,1,0;

S1          =   [1,1,1];
S2          =   [0,1,1];
S3          =   [0,0,1];
S4          =   [1,0,1];
S5          =   [1,0,0];
S6          =   [0,1,0];
"           UNUSED STATES
1S7         =   [0,0,0];
S8          =   [1,1,0];

EQUATIONS

CFILL     =    CA & !CACHE_ & LOCK_;"CACHEABLE CYCLE

HOLD      :=   HHOLD & PHASE & !RSTCPU & LOCK_
15             # (HOLD & (HHOLD # !PHASE));"HOLD REQUESTS

STATE_DIAGRAM [STBLST1, STBLST2, BLAST_]

STATE S1 :   IF (!WR & T2 & BRDY_)  THEN S5"START READ
               ELSE IF (!WR & T2 & !BRDY_ & !CACHE_) THEN S2 "READ CACHE HIT
               ELSE S1;

2STATE S2 :    IF (!BOFF_ # RSTCPU # CACHE_)  THEN S1

-4-

APPENDIX "A"

```
                    ELSE IF (!BRDY_)   THEN S3
                    ELSE S2;

STATE S3    :   IF (!BOFF_ # RSTCPU # CACHE_)  THEN S1
                    ELSE IF (!BRDY_)   THEN S6
 5                  ELSE S3;

STATE S4    :   IF (CA & !CACHE_ & !BRDY_)  THEN S2
                    ELSE IF (!CA & PHASE)  THEN S5
                    ELSE IF (!BOFF_ # RSTCPU)  THEN S1
                    ELSE S4;

1STATE S5   :   IF (!BOFF_ # RSTCPU)  THEN S1"SET BLAST
                    ELSE IF ((!CA # CACHE_) & !BRDY_)  THEN S1  "SET BLAST
                    ELSE IF (CA & PHASE & !CACHE_)  THEN S4
                    ELSE S5;

STATE S6    :   IF (!BOFF_ # !BRDY_ # RSTCPU)  THEN S1  "ASSERT BLAST ON L FILL

1STATE S7   :   GOTO S1;

STATE S8    :   GOTO S1;

END CBLAST
```

-5-

APPENDIX "A"

```
"CBRDY, U12, 50A6, 20R6-5
"          Revision History
"
" 04-14-93  JLU1WS ON FIFO WR AFTER AFULL, USE WBADS
5 03-05-93  JLUBELUMAN
" 02-03-93  JLUREG FLUSH TO BLOCK BRDY AFTER FLUSH CYCLE
" 02-02-93  JLUNO CACHE_, ALLOW 2ND CACHE TO GIVE DATA
" 01-28-93  JLUNO BGO, BGE TO FULL FLAG FOR COMBINING
" 01-26-93  JLUADD BGO, BGE TO FULL FLAG FOR COMBINING
10 01-14-93  JLUREMOVE CA FROM READY AND PENDING
" 01-08-93  JLUADD CA BACK TO READY AND PENDING
" 12-22-92  JLUREVERSE F3REG ON RDY
" 12-07-92  JLUREMOVE CA FROM READY AND PENDING
" 12-06-92  JLUMOVE HRDY OUT, PUT BACK BUSCYC
15 11-18-92  JLUMODIFIED FOR HITACHI WRITE FIFO
" 03-18-92  DBOUVIER:INITIAL DESIGN

MODULE CBRDY
TITLE 'BURST READY PAL3-18-92'

"Description

20THIS PAL DRIVES BURST READY TO THE P5. OTHER PALS USE THIS SIGNAL FOR
"CACHE HIT INDICATION (READ WITH BRDY IN T2). THIS PAL DETERMINES CACHE HIT
"FROM CACHEABILITY INFORMATION AND THE FACT THAT THE TAGS SHOW A HIT IN THE
"CACHE (NO KEN FROM PLANER). IT ALSO COMBINES OTHER SOURCES OF BRDY. THIS
"PAL DOES NOT USE BLAST TO TERMINATE THE CACHE HIT.
```

APPENDIX "A"

"Declarations

"Define Device

CBRDY       device 'P20R6';

"Define Inputs

| | | | |
|---|---|---|---|
| CLKCPU | pin 1; | "(2) | 66 MHz CLOCK INPUT |
| WR | pin 2; | "(3) | WRITE READ |
| LOCK_IO | pin 3; | "(4) | LOCK OR IO CYCLE |
| F3FULL | pin 4; | "(5) | CPU DATA CODE |
| HIT | pin 5; | "(6) | CACHE HIT |
| FLUSH_ | pin 6; | "(7) | FLUSH SECONDARY CACHE |
| CACHE_ | pin 7; | "(9) | PROCESSOR WANTS TO BURST |
| BUSCYC | pin 8; | "(10) | RDY FROM SPECIAL CYC, READS, BYPASS |
| T2 | pin 9; | "(11) | PROCESSOR 2ND T STATE |
| F3AFULL | pin 10; | "(12) | ALMOST FULL FLAG |
| WBADS | pin 11; | "(13) | WB T2 |
| TEST | pin 13; | "(16) | TEST PIN |
| DLYFULL_ | pin 14; | "(17) | DLY F3FULL THRU F04 |
| CA | pin 23; | "(27) | CACHEABLE WRITE |
| GND | pin 12; | "(14) | GND PIN |

20     "Define Outputs

| | | | |
|---|---|---|---|
| CHIT_ | pin 15; | "(18) | BUFFER HIT SIGNAL |
| F3AFREG | pin 16; | "(19) | |

APPENDIX "A"

```
CBRDY0_        pin 17;    "(20) CACHE BRDY STATE BIT
CBRDY1_        pin 18;    "(21) CACHE BRDY STATE BIT
WRDYPEND_      pin 19;    "(23) WRDY FIFO3 PENDING
F3FREG         pin 20;    "(24) WRITE BUFFER BRDY STATE BIT BLUSHREG_      pin 21;    "(25) FLUSH DELAY ONE CLOCK TO BLOCK BRDY
BRDY_          pin 22;    "(26) P5 BURST READY VCC            pin 24;    "(28) VCC PIN "Define Constants

H,L,X,Z,C,T,F  =1,0,.X.,.Z.,.C.,1,0;

10 EQUATIONS

!BRDY_     = T2 & !WR & !LOCK_IO & HIT & FLUSHREG_"READ CACHE HIT
            # WBADS & WR & !LOCK_IO & !F3FREG"WRITE FIFO READY
            # !WRDYPEND_ & !F3FREG      "RDY AFTER FIFO UNFULL
            # BUSCYC    "READ MISS, LOCKED, SPEC CYC

15          # !CBRDY0_ & !WR"THESE SIGNALS FORCE 4 BRDYS DURING A HIT
            # !CBRDY1_ & !WR;"(FLUSH IS IN THE 1ST TERM BECAUSE THE TAG
            "RAM LOOKS LIKE A HIT DURING FLUSHING)

!CBRDY0_    : = T2 & !WR & !BRDY_ & !CACHE_"CACHE READ HIT
             # !WR & !CBRDY0_ & CBRDY1_;"HOLD TERM DURING READ
```

-8-

APPENDIX "A"

```
!CBRDY1_      : = !WR & !CBRDY0_;"MORE CACHE HIT BRDY HOLD

!WRDYPEND_    : = WBADS & WR & !LOCK_IO & F3FREG"SET ON WRITE FULL,
              # !WRDYPEND_ & F3FREG;"CLEAR ON NOT FULL.

F3AFREG       : = F3AFULL;

B3FREG        : = F3FULL;

FLUSHREG_     : = FLUSH_;

!CHIT_        = HIT & !LOCK_IO & FLUSHREG_;"INVERTED CACHE HIT
              "PROCESSOR WANTS TO CACHE.

END CBRDY
```

-9-

APPENDIX "A"

```
"  CBUF, U14, 46C7, 20R6-5
"         REVISION HISTORY
"
"  03-06-93  JLUBELUMAN
5  02-22-93  JLUREG AFULL FLAG
"  01-27-93  JLUUSE F3REG FROM CBRDY PAL
"  01-26-93  JLUADD AF3FULL FOR BGE
"  01-20-93  JLUUSE REG FLAGS, BYPASS MEMWR LOCK CYCLE
"  01-15-93  JLUADD CA TO BGE_
10 01-14-93  JLUREMOVE CA, ALL MEMWR TO FIFO3
"  01-13-93  JLUADD RESET_ TO WRF3_, REMOVE TRISTATE.
"  12-22-92  JLUADD RESET_ WRPEND
"  12-14-92  JLUADD RESET_ TO TRISTATE WRF3_
"  12-06-92  JLUSWITCH TO WBADS
15 11-18-92  JLUMODIFIED FOR HITACHI
"  10-03-92  JLUINITIAL DESIGN

MODULE CBUF
TITLE 'WRITE BUFFER CPU SIDE CONTROLS'

"DESCRIPTION

20THIS PAL DERIVES DETERMINES WHEN A CYCLE MUST OCCUR TO THE BUS AND PASSES
"A READY SIGNAL TO THE BRDY PAL WHEN THE CYCLE IS DONE

"DECLARATIONS

"DEFINE DEVICE
```

-10-

APPENDIX "A"

```
CBUF        DEVICE 'P20R6';

"DEFINE INPUTS

CLKCPU          PIN 1;   "(2)  66 MHZ CLOCK INPUT

CA              PIN 2;   "(3)  CACHEABLE

F3FREG          PIN 3;   "(4)  FIFO3 FULL FLAG

CHIT_           PIN 4;   "(5)  CACHE HIT

WR              PIN 5;   "(6)  WRITE READ

WBADS           PIN 6;   "(7)  T2 FOR WR BUFFERS

BOFF_           PIN 7;   "(9)  PROCESSOR BACK OFF

LOCK_IO         PIN 8;   "(10) LOCK OR IO

F3AFULL         PIN 9;   "(11) ALMOST FULL FLAG

XXXX            PIN 10;  "(12) BGO

F3EMPTY         PIN 11;  "(13) F3EMPTY FLAG

TEST            PIN 13;  "(16) REG OE

RSTCPU_         PIN 14;  "(17) RESET CPU, TRI-STATE COMB

DBYPASS_        PIN 23;  "(27) DATACHIP BYPASS

GND             PIN 12;  "(14) GND PIN

"DEFINE OUTPUTS

WRF3_           PIN 15;  "(18) WRITE FIFO3

WRPEND_         PIN 16;  "(19) WRITE FIFO3 PENDING

F3EREG          PIN 17;  "(20) REG F3EMPTY

F3AFREG         PIN 18;  "(21) XXX

BGE_            PIN 19;  "(23) BYTE GATHERING ENABLE

WRF2B_          PIN 20;  "(24) FIFO2 WRITE FOR READ LINE FILL ADDRESS
```

-11-

```
                                 APPENDIX "A"
BYPEND_           PIN 21; "(25) BYPASS PENDING
CBELE_            PIN 22; "(26) BE LATCH ENABLE

VCC               PIN 24; "(28) VCC PIN

"DEFINE CONSTANTS

H,L,X,Z,C,T,F  =1,0,.X.,.Z.,.C.,1,0;

MEMWR      =     ( WR & !LOCK_IO);"MEM WRITE
MEMRD      =     (!WR & !LOCK_IO); "MEM READ

EQUATIONS

!CBELE_    =    WBADS;"LATCH BE ON EACH T2

10WRF3_    =    !RSTCPU_
                #  WBADS & MEMWR & !F3FREG & BOFF_"MEM WRITE
                #  !WRPEND_ & !F3FREG;"WRITE AFTER NOT FULL

!WRPEND_   :=   WBADS & MEMWR & F3FREG & BOFF_
                #  !WRPEND_ & F3FREG & RSTCPU_;"CLEAR ON NOT FULL.

1B3EREG    :=   F3EMPTY;"SYNC EMPTY FLAG.

!BGE_      :=   F3AFREG & MEMWR & CA & RSTCPU_;"BGE ON F3AFULL
                "!RESET_;
```

-12-

APPENDIX "A"

```
F3AFREG    : = F3AFULL;

!WRF2B_    : = WBADS & MEMRD;"CACHE MISS LINE FILL

!BYPEND_   : = WBADS & CHIT_ & !MEMWR & BOFF_"SET BYPASS, NON CHIT
             #   !BYPEND_ & DBYPASS_ & RSTCPU_;"HOLD TILL DATA CHIP BYPASS
ASSERT

END CBUF
```

APPENDIX "A"

```
"CBUF1, U18, 84BC, 22V10-7
"         Revision History
"
" 05-24-93   JLU:ADD BOFF_ IN T2
5 05-07-93   JLU:ADD BOFF_ IN WBADS
" 04-14-93   JLU:1WS FIFO WR ON F3AFULL
" 03-05-93   JLU:BELUMAN
" 12-15-92   JLU:ADD RESET_, SWAP ADS/BE4
" 12-12-92   JLU:ADD BOFF TO WADS, MOVE WRREG IN, CSGATE OUT
10 12-06-92  JLU:MODIFY FOR BELUGA
" 03-18-92   DBOUVIER:INITIAL DESIGN

MODULE CBUF1
TITLE 'BUFFER INTERFACE PAL  3-18-92'

"Description

15THIS PAL DERIVES DETERMINES WHEN A CYCLE MUST OCCUR TO THE BUS AND PASSES
"A READY SIGNAL TO THE BRDY PAL WHEN THE CYCLE IS DONE

"Declarations

"Define Device
CBUF1   device 'P22V10';

20      "Define Inputs
CLKCPU      pin 1;   "(2)   66 MHz CLOCK INPUT
ADS_        pin 2;   "(3)   PROCESSOR ADS
```

-14-

APPENDIX "A"

```
MIO         pin 3;   "(4)
CHIT_       pin 4;   "(5)  CACHE HIT
WR          pin 5;   "(6)  WRITE READ
DC          pin 6;   "(7)  DATA / CODE CYCLE
BOFF_       pin 7;   "(9)  PROCESSOR BACK OFF
LOCK_       pin 8;   "(10) LOCK CYCLE
WBRDY       pin 9;   "(11) WRITE BUFFER RDY
PHASE       pin 10;  "(12)
BE4_        pin 11;  "(13) BYTE ENABLE 4
1B3FREG     pin 13;  "(16) REG F3FULL FLAG
RESET       pin 14;  "(17) SYSTEM RESET
BLAST_      pin 23;  "(27) BURST LAST
F3AFREG     pin 15;  "(18) ALMOST FULL FLAG GND         pin 12;  "(14) GND PIN 15          "Define Outputs LOCK_IO     pin 16;  "(19) LOCK OR IO CYCLE
WBADS       pin 17;  "(20) WRITE BUFFER ADS#
WRREG       pin 18;  "(21) REG WR
BUSCYC      pin 19;  "(23) HOLD PROCESSOR FOR THE BUS CYCLE
2T2         pin 20;  "(24) T2
RSTCPU      pin 21;  "(25) P5 RESET
WBPEND_     pin 22;  "(26) WBPENDING, NOT USED VCC         pin 24;  "(28) VCC PIN
```

-15-

APPENDIX "A"

APPENDIX "A"

"Define Constants

H,L,X,Z,C,T,F  =1,0,.X.,.Z.,.C.,1,0;

SPCYC = (WR & !DC & !BE4_);"SPECIAL CYCLE FOR FLUSH ACK
FIFOWR = (WR & MIO & LOCK_);"FIFO WRITE

```
     EQUATIONS

LOCK_IO    =  !LOCK_ # !MIO;

WBADS      := !ADS_ & !FIFOWR & BOFF_ & !SPCYC"ADS TO NON-FIFO CYCLE
              # !ADS_ & !F3AFREG & FIFOWR & BOFF_ & !SPCYC"WR FIFO, 0WS
              # T2 & !WBADS & FIFOWR & BOFF_ & !SPCYC;"WR FIFO, 1WS

WBPEND_    := T2 & FIFOWR & F3FREG & BOFF_ & !SPCYC"NOT USED BY WBADS
              # !WBPEND_ & F3FREG & !RSTCPU;

T2         := !ADS_ & BOFF_;
              "READY SIGNAL FROM STSTEM DURING BUS CYCLE
BUSCYC     := WBRDY & !PHASE "RDY FOR 1 66CLK
              # SPCYC & !ADS_;"IMMEDIATE READY ON FLUSH ACK

WRREG      := WR;"REG VERSION OF WR

RSTCPU     = RESET;"RESET SYSTEM
             "ASSUMING RSTCPU COMES UP HIGH.
```

-17-

APPENDIX "A"

END CBUF1

APPENDIX "A"

```
"CCACHE, U15, 59A6, 20R6-5
"         Revision History

" 03-18-93  JLUBOFF WITH CWE AND CSGATE
" 02-02-93  JLU2ND CACHE OUTPUT ON NON CACHE_ CYCLE
5 12-22-92  JLUSWAP POK TO POK_
" 12-15-92  JLUSWAP OE, ADS & BRDY, USE POK
" 12-12-92  JLUSWAP CWE AND CADV FOR LAYOUT
" 11-24-92  JLUMOVE T2 IN, CHIT_ OUT. CHANGE TO 20R6
" 11-22-92  JLUMOVE CSGATE IN, T2 OUT.
10 03-18-92  DBOUVIER:INITIAL DESIGN

MODULE CCACHE
TITLE 'CACHE SRAM CONTROL PAL  -  3-18-92'

"Description

"THIS PAL DRIVES THE CACHE RAM CONTROL SIGNALS (WE, OE, ADV, ADSC)
15FOR READ HITS, WRITE MISSES, AND READ MISS LINE FILLS.

"Declarations

"Define Device
   CCACHE    device 'P20R6';

"Define Inputs
2CLKCPU       pin 1;   "(2)  66 MHz CLOCK INPUT
  BRDY_       pin 2;   "(3)  P5 READY
```

-19-

APPENDIX "A"

```
WR            pin 3;   "(4)  PROC WRITE/READ SIGNAL
MIO           pin 4;   "(5)  PROC MEM/IO SIGNAL
HIT           pin 5;   "(6)  TAG MATCH
BOFF_         pin 6;   "(7)  BACK OFF
6KEN_         pin 7;   "(9)  KEN FOR READ MISS
BLAST_        pin 8;   "(10) BURST LAST
CACHE_        pin 9;   "(11) PROCESSOR WANTS TO BURST
RSTCPU        pin 10;  "(12) POWER OK
ADS_          pin 11;  "(13) PROC ADDRESS STROBE
1WEST         pin 13;  "(16) TRISTATE REG TERMS
CACONT_OE_    pin 14;  "(17) TEST
XXX           pin 23;  "(27) SPARE GND           pin 12;  "(14) GND PIN "Define Outputs 16ADV_        pin 15;  "(18) INVERTED CACHE HIT
T2            pin 16;  "(19) PROCESS SECOND T2
CWESB_        pin 17;  "(20) STATE BIT USED IN CWE SIGNAL
CSGATE        pin 18;  "(21) SELECT ALL BE EXCEPT DURING WR
COE_          pin 19;  "(23) CACHE OUTPUT ENABLE
2CADVSB_      pin 20;  "(24) STATE BIT USED IN CADV SIGNAL
 "spare       pin 21;  "(25)
CWE_          pin 22;  "(26) INVERTED CACHE HIT VCC           pin 24;  "(28) VCC PIN
```

-20-

APPENDIX "A"

APPENDIX "A"

Define Constants

H,L,X,Z,C,T,F  =1,0,.X.,.Z.,.C.,1,0;

EQUATIONS

```
T2          := !ADS_ & BOFF_;"PROCESSOR SECOND T-STATE

6SGATE      := !ADS_ & WR & BOFF_;"SELECT ALL BE ALL THE TIME BUT WRITE

!CWE_       = WR & MIO & HIT & T2 & BOFF_"0 WAIT STATE WRITE THRU (HIT)
            # !CWESB_;"READ MISS LINE FILL

CWE_.oe     = !CACONT_OE_;

!CWESB_     := !CKEN_ & CWESB_"READ MISS LINE FILL (IF CACHEABLE)
10          # !CWESB_ & (BLAST_ # BRDY_) & !RSTCPU;"HOLD DURING READ

!COE_       := !ADS_ & !WR & MIO & BOFF_ "OE DURING T2 IN CASE IT'S A HIT
            # T2 & !BRDY_ & !COE_ & !CACHE_"HOLD DURING CACHE HIT
            # !T2 & !COE_ & BLAST_ & !CACHE_ & !RSTCPU;"SAME

!CADV_      = T2 & !WR & MIO & HIT & !CACHE_"ADVANCE DURING READ HIT
15          # !COE_ & !T2"SAME
            # !CADVSB_;"ADV DURING LINE FILL (MISS)

CADV_.oe    = !CACONT_OE_;
```

-22-

APPENDIX "A"

```
!CADVSB_   := !WR & !BRDY_ & BLAST_;"ADV DURING READ MISS LINE FILL

END CCACHE
```

-23-

APPENDIX "A"

```
"CFLUSH, U13, 34A5, 20R6-7
"         Revision History

" 04-07-93  JLUFLUSH WITH !WRTPROT_ FROM SYSTEM
" 04-01-93  JLUDON'T FLUSH P5
" 03-19-93  JLUPHASE IN CKEN
" 03-18-93  JLUFLUSHP5, NO CHIT, NO STF2
" 03-05-93  JLUBELUMAN
" 12-14-92  JLUADD WBRD, ADD CA
" 03-25-92  D BOUVIER:INITIAL DESIGN

MODULE CFLUSH
TITLE 'CACHEABILITY AND FLUSH PAL 3-25-92'

"Description

"THIS PAL DRIVES CACHEABILITY SIGNALS TO THE P5 AND TO THE CACHE PAL.
"IT ALSO HANDLES FLUSHING THE CACHES (BOTH USE THE SAME SIGNAL).

"Declarations

"Define Device
CFLUSH    device 'P20R6';

"Define Inputs
CLKCPU    pin 1;   "(2)   66 MHz CLOCK INPUT
WBRD      pin 2;   "(3)   WRBUF READ
HHLDA     pin 3;   "(4)
```

APPENDIX "A"

```
T2            pin 4;   "(5)  PROCESSOR SECOND T STATE
DLYADS_       pin 5;   "(6)  HADS DELAYED BY 1 25MHZ CLOCK
CACHE_        pin 6;   "(7)  P5 CACHEABLE INPUT
LOCK_         pin 7;   "(9)  P5 LOCK
WRTPROT_      pin 8;   "(10) TRANE WRITE PROTECT
KEN_          pin 9;   "(11) TRANE CACHEABILITY INPUT
WRREG         pin 10;  "(12) REGISTERED WRITE READ
CHIT_         pin 11;  "(13) CACHE HIT
TEST          pin 13;  "(16) REGISTER OE
1PHASE        pin 14;  "(17) TEST PIN
HEADS_        pin 23;  "(27) (NOT USED)

GND           pin 12;  "(14) GND PIN

"Define Outputs

CWRTPROT      pin 15;  "(18) CDT WRITE PROTECT I/O
16PUKEN_      pin 16;  "(19) CACHEABILITY TO THE 586
FLUSHP5_      pin 17;  "(20) FLUSH THE PROCESSOR
FLUSH_        pin 18;  "(21) FLUSHES THE CACHE
STF1          pin 19;  "(23) FLUSH STATE BIT
XXXXX         pin 20;  "(24)
2CKEN_        pin 21;  "(25) CACHEABILITY FOR READ MISSES
CA            pin 22;  "(26) CA VCC           pin 24;  "(28) VCC PIN "Define Constants
```

APPENDIX "A"

H,L,X,Z,C,T,F  =1,0,.X.,.Z.,.C.,1,0;

EQUATIONS

"THIS PAL GENERATES THE FLUSH SIGNAL FOR THE SECONDARY CACHE AND THE PROCESSOR.

```
                   "READ MISS KEN FROM TRANE
CPUKEN_    := WBRD & KEN_"KEEP TAGS FROM BEING UPDATED ON A LOCKED READ

# CACHE_
              # !LOCK_;

FLUSHP5_   := WBRD # !WBRD;

FLUSH_     :=
                  !WRTPROT_ & PHASE & !DLYADS_ & !WBRD & !STF1"ON WRITE
PROTECT
              "2 CLKS, 30ns RESET PW FOR TAGS
              # !FLUSH_ & !STF1;

STF1       := !FLUSH_ & !STF1;

"CKEN TELLS CACHE PAL TO START THE LINE FILL,
              "IT IS ONLY ACTIVE FOR DLYADS.
!CKEN_     := WBRD & !KEN_ & !CACHE_ & LOCK_ & !DLYADS_ & PHASE;

CA         = !KEN_;
```

-26-

APPENDIX "A"

```
CA.oe      = WBRD;"DRIVE CA ON READ MISS CYCLES

CWRTPROT    = !WRTPROT_;

CWRTPROT.oe = WBRD;"DRIVE CWRTPROT ON READ MISS CYCLES

END CFLUSH
```

APPENDIX "A"

```
"CSNOOP, U6, 6562, 20R6-5
"         Revision History
"
" 05-12-93   JLUADD !HHLDA TO TAGWE
5 03-25-93   JLUMOVE ADIR TO START FROM S4
" 03-23-93   DBOUVIERCHANGED TAGWE TO S9
" 03-06-93   JLUBELUMAN
" 01-28-93   JLUTAGWE, EADS FIX
" 01-12-93   JLUADD PHASE TO TAGWE
10 12-15-92  JLUSWAP OE, HWR
" 11-20-92   DBOUVIER:MODIFIED FOR BELUGA.
" 03-25-92   DBOUVIER:INITIAL DESIGN.

MODULE CSNOOP
TITLE 'SNOOP PAL EQUATIONS 3-25-91'

15        "Description
"THIS PAL CONTAINS THE SNOOP STATE MACHINE. IT DRIVES THE SNOOP SIGNALS
"TO THE CACHES. THIS PAL ALSO GATES HHOLD AND SLOW HOLD TOGETHER.

"Define Device
 CSNOOP    device 'P20R6';

20        "Define Inputs
 CLKCPU       pin 1;   "(2)   66 MHz CLOCK INPUT
 HWR          pin 2;   "(3)   HOST WR
 HHLDA        pin 3;   "(4)   HOST BUS HOLD ACK
 HOLD         pin 4;   "(5)   HOLD REQ
```

APPENDIX "A"

```
PHASE         pin 5;   "(6)  LOW 33CLK
EHHLDA        pin 6;   "(7)  EARLY HOLD ACKNOWLEDGE
HEADS_        pin 7;   "(9)  HOST BUS SNOOP STROBE
DLYADS_       pin 8;   "(10) HOST ADS DELAYED 1 33MHZ CLK
6PUKEN_       pin 9;   "(11) 586 KEN INPUT
BRDY_         pin 10;  "(12) BURST READY
HIT           pin 11;  "(13) TAG RAM MATCH PIN
TEST          pin 13;  "(16) REG OE
SNOOP_OE_     pin 14;  "(17)
1SPARE        pin 23;  "(27) SPARE GND           pin 12;  "(14) GND PIN "Define Outputs ADIR_         pin 15;  "(18) DIRECTION SIGNAL FOR WB ADDR BUFFERS
TAGWE_        pin 16;  "(19) TAG WRITE ENABLE FOR SNOOP OR LINE FILL
1SNSB1        pin 17;  "(20) STATE BIT
EADS_         pin 18;  "(21) SNOOP THE CACHES
SNSB2         pin 19;  "(23) STATE BIT
SNSB3         pin 20;  "(24) STATE BIT
BOFF_         pin 21;  "(25) CACHE CONTROL BACK OFF HOLD TERM
2CPUBOFF_     pin 22;  "(26) CPU BACK OFF VCC           pin 24;  "(28) VCC PIN "Define Constants
```

-29-

APPENDIX "A"

```
H,L,X,Z,C,T,F = 1,0,.X.,.Z.,.C.,1,0;
```

APPENDIX "A"

```
"       Declarations
S0              = ^hf;
S1              = ^h7;
S2              = ^h3;
S3              = ^hl;
S4              = ^h9;
S5              = ^hd;
S6              = ^hc;
S7              = ^h4;
S8              = ^hb;
S9              = ^h5;

"   STATE TERMS ARE INVERTED TO OVERCOME ABEL4 COMPILE PROBLEM
ST0             = !SNSB1.Q &  !SNSB2.Q &  !SNSB3.Q &  !EADS_.Q;
ST1             =  SNSB1.Q &  !SNSB2.Q &  !SNSB3.Q &  !EADS_.Q;
ST2             =  SNSB1.Q &   SNSB2.Q &  !SNSB3.Q &  !EADS_.Q;
ST3             =  SNSB1.Q &   SNSB2.Q &   SNSB3.Q &  !EADS_.Q;
ST4             = !SNSB1.Q &   SNSB2.Q &   SNSB3.Q &  !EADS_.Q;
ST5             = !SNSB1.Q &  !SNSB2.Q &   SNSB3.Q &  !EADS_.Q;
ST8             = !SNSB1.Q &   SNSB2.Q &  !SNSB3.Q &  !EADS_.Q;
ST7             =  SNSB1.Q &  !SNSB2.Q &   SNSB3.Q &   EADS_.Q;
ST6             = !SNSB1.Q &  !SNSB2.Q &   SNSB3.Q &   EADS_.Q;
ST9             =  SNSB1.Q &  !SNSB2.Q &   SNSB3.Q &  !EADS_.Q;

"UNUSED STATES
S10             = ^h0;
S11             = ^h6;
S12             = ^h8;
```

-31-

APPENDIX "A"

```
S13          = ^ha;
S14          = ^h2;
S15          = ^he;

EQUATIONS

ADIR_    = HHLDA & (ST4 # ST5 # ST6 # ST7);

ADIR_.oe = !SNOOP_OE_;

!TAGWE_  := !HHLDA & ST9 & !BRDY_ & !CPUKEN_ & !HWR"CACHEABLE READ MISS
            # ST5 & HIT;"SNOOP HIT

!BOFF_   := HHLDA & ST1 & !HEADS_ & PHASE
            # !CPUBOFF_;
            "BACK OFF SIGNAL TO CACHE PALS
            "TO KEEP BACKOFF ACTIVE ONE CLOCK BEYOND
            "CPUBOFF_ SO THAT THE PROCESSOR HAS TIME
            "TO START DRIVING THE BUS AGAIN.

CPUBOFF_ = HHLDA & (ST2 # ST3 # ST4 # ST5 # ST6 # ST7);   "BOFF SIGNAL TO THE

CPUBOFF_.oe = !SNOOP_OE_;
```

APPENDIX "A"

STATE_DIAGRAM [SNSB1, SNSB2, SNSB3, EADS_]

```
STATE S0        : IF (HHLDA) THEN S1
                ELSE IF (!HHLDA & !DLYADS_ & PHASE & !HWR & !HIT) THEN S9
                ELSE S0;"GOING INTO HOLD, TRISTATE ADDR BUFFER

STATE S1        : IF !HHLDA THEN S0"WAIT FOR A SNOOP
                ELSE IF (!HEADS_ & PHASE) THEN S2"WAIT FOR SNOOP
                ELSE S1;

STATE S2        : IF !HHLDA THEN S0
                ELSE S3;

STATE S3        : IF !HHLDA THEN S0
                ELSE S4;

STATE S4        : IF !HHLDA THEN S0
                ELSE S5;

STATE S5        : IF !HHLDA THEN S0
                ELSE S6;

STATE S6        : IF !HHLDA THEN S0
                ELSE S7;

STATE S7        : IF !HHLDA THEN S0
                ELSE S8;
```

-33-

APPENDIX "A"

```
STATE S8     :  IF !HHLDA THEN S0
                ELSE S1;

STATE S9     :  IF (!BRDY_ # HHLDA) THEN S0
                ELSE S9;

STATE S10    :  GOTO S0;

STATE S11    :  GOTO S0;

STATE S12    :  GOTO S0;

STATE S13    :  GOTO S0;

STATE S14    :  GOTO S0;

STATE S15    :  GOTO S0;

END CSNOOP
```

APPENDIX "A"

```
"HBUF, U7, B8D4, 22V10-7
"        REVISION HISTORY
"
" 03-06-93  JLUBELUMAN
5 02-05-93  JLUREMOVE LOWCLK FROM RDYS
" 01-21-93  JLUHOLD TO BLOCK EXTRA RDF3
" 01-21-93  JLUADD LOWCLK TO QUALIFY ALL SIGNALS
" 01-18-93  JLU22V10 TO HANDLE RDY
" 01-18-93  JLUUSE MA2 TO FILTER LAST RD
10 01-17-93 JLUNEW STATES
" 01-13-93  JLURSTCPU FOR RDF3_ DURING RESET
" 01-11-93  JLUNEW H0, H1 STATES
" 12-21-92  JLUdebug RDF3
" 12-21-92  JLURSTCPU TRI-STATE RDF3, RDF2B FOR CONFIG.
15 12-04-92 JLUMOVE TO 20L8. USE MA2 AS DW SELECT.
" 10-03-92  JLUINITIAL DESIGN

MODULE HBUF
 TITLE 'WRITE BUFFER SYS SIDE CONTROLS'

"DESCRIPTION

20THIS PAL PROVIDES THE CONTROLS TO THE WRITE BUFFERS ON THE SYSTEM.

"DECLARATIONS

"DEFINE DEVICE
 HBUF           DEVICE 'P22V10';
```

-35-

APPENDIX "A"

"DEFINE INPUTS

| CLKSYS | PIN 1; | "(2) | 33 MHZ CLOCK INPUT |
| --- | --- | --- | --- |
| WBS0 | PIN 2; | "(3) | WB STATE BIT |
| WBS1 | PIN 3; | "(4) | WB STATE BIT |
| WBS2 | PIN 4; | "(5) | WB STATE BIT |
| WBS3 | PIN 5; | "(6) | WB STATE BIT |
| MA2 | PIN 6; | "(7) | MA2 |
| HS1 | PIN 7; | "(9) | HADS STATE BIT |
| HS0 | PIN 8; | "(10) | HADS STATE BIT |
| 1RDYIN_ | PIN 9; | "(11) | SYSTEM RDY |
| DBRDY_ | PIN 10; | "(12) | SYSTEM BRDY |
| HDOE_ | PIN 11; | "(13) | DATA OE |
| HOLD | PIN 13; | "(16) | HOLD |
| F3EREG | PIN 14; | "(17) | FIFO3 EMPTY FLAG |
| 1664PEND_ | PIN 23; | "(27) | 64BIT CYCLE PENDING |
| GND | PIN 12; | "(14) | GND PIN |

"DEFINE OUTPUTS

| RDF3_ | PIN 15; | "(18) | READ FIFO3 |
| --- | --- | --- | --- |
| D0MOE_ | PIN 16; | "(19) | LOW DW OE |
| 2D1MOE_ | PIN 17; | "(20) | HIGH DW OE |
| D0MORDY_ | PIN 18; | "(21) | LOW DW RDY |
| D1MORDY_ | PIN 19; | "(23) | HI DW RDY |
| D0MBEOE_ | PIN 20; | "(24) | LO DW BEOE |
| D1MBEOE_ | PIN 21; | "(25) | HI DW BEOE |
| 2RDF2B_ | PIN 22; | "(26) | READ FIFO2B FOR LINE FILL |

-36-

APPENDIX "A"

```
VCC           PIN 24;  "(28) VCC PIN

"DEFINE CONSTANTS

H,L,X,Z,C,T,F  =1,0,.X.,.Z.,.C.,1,0;

STIDLE     =   (!WBS3 & !WBS2 & !WBS1 & !WBS0);
STR2       =   (!WBS3 & !WBS2 & !WBS1 &  WBS0);
STW1       =   (!WBS3 & !WBS2 &  WBS1 & !WBS0);
STR4       =   (!WBS3 & !WBS2 &  WBS1 &  WBS0);
STRB1      =   (!WBS3 &  WBS2 & !WBS1 & !WBS0);
STR6       =   (!WBS3 &  WBS2 & !WBS1 &  WBS0);
1STWB1     =   (!WBS3 &  WBS2 &  WBS1 & !WBS0);
STR8       =   (!WBS3 &  WBS2 &  WBS1 &  WBS0);
STWB2      =   ( WBS3 & !WBS2 & !WBS1 & !WBS0);
STRB2      =   ( WBS3 & !WBS2 & !WBS1 &  WBS0);
STW2       =   ( WBS3 & !WBS2 &  WBS1 & !WBS0);
1STR1      =   ( WBS3 & !WBS2 &  WBS1 &  WBS0);
STR3       =   ( WBS3 &  WBS2 & !WBS1 & !WBS0);
STR5       =   ( WBS3 &  WBS2 & !WBS1 &  WBS0);
STR7       =   ( WBS3 &  WBS2 &  WBS1 & !WBS0);
STG1       =   ( WBS3 &  WBS2 &  WBS1 &  WBS0);

2STHIDLE   =   ( HS1 & !HS0 );
STH0       =   (!HS1 & !HS0 );
STH1       =   (!HS1 &  HS0 );
STB1       =   ( HS1 &  HS0 );
```

APPENDIX "A"

```
HIDLE    =    ^H2;"10
H0       =    ^H0;"00
H1       =    ^H1;"01
B1       =    ^H3;"11

RDY      =    (!DBRDY_ # !RDYIN_);

EQUATIONS

!RDF2B_  = STH0 & STRB1 & !CLKSYS   "FIRST RD, LATCH M
         # RDY & (STR2 # STR4 # STR6) & !CLKSYS;   "6 RD'S,
           "MA2 DON'T NEED LAST ONE

!0RDF3_  =      "CONFIG HIGH DURING RESET
                STH0 & STH1 & !CLKSYS    "FIRST RD, LATCH M
         # RDY & STW1 & !(F3EREG # HOLD & C64PEND_) & !CLKSYS        "RD
NEXT
         # RDY & STW2 & !(F3EREG # HOLD) & !CLKSYS;   "RD NEXT

!D0MBEOE_ =  !WBS3 & !HDOE_;   "LOW MBE ON

!D1MBEOE_ =   WBS3 & !HDOE_;   "HIGH MBE ON

!D0MOE_   =  (STW1 # STWB1);   "LOW DW OUTPUT

!D1MOE_   =  (STW2 # STWB2);   "HIGH DW OUTPUT

!D0MORDY_ =  RDY & (STW1) & C64PEND_"ONE 32 RDY
```

APPENDIX "A"

```
           #   RDY & (STW2 # STWB1 # STRB1)"RDY ON 32BIT

RDY & (STR2 # STR4 # STR6 # STR8) & !MA2;"RDY ON 32BIT

!D1MORDY_ =    RDY & (STW1) & C64PEND_"ONE 32 RDY

#   RDY & (STW2 # STWB2 # STRB2)"32 BIT
5          #   RDY & (STR2 # STR4 # STR6 # STR8) & MA2;"32 BIT
END HBUF
```

APPENDIX "A"

```
"HBUF1, U8, A8D5, 22V10-7
"          REVISION HISTORY
"
"  04-13-93  JLUUNREG DBYPASS FOR CORRECT BE TIMING
5  03-05-93  JLUBELUMAN
"  02-22-93  JLUTRI-STATE MA2 DURING IDLE STATE
"  01-28-93  JLUABYPASS WITH ADIR FOR SNOOP
"  01-20-93  JLUWBRD NOT ASSERT IN IDLE STATE
"  01-19-93  JLUFIX C64PEND WITH RDF3, BYPASS C64PEND
10 01-17-93  JLUNEW STATES, ADD RDMA2, STH1
"  01-13-93  JLUABYPASS AND DBYPASS DEFAULT
"  01-12-93  JLUREGISTER WBRD
"  01-11-93  JLUADD EMA2
"  01-06-93  JLUADD WBRD
15 12-21-92  JLUADD POK FOR CORRECT RESET
"  12-04-92  JLUBYPASS, PENDING CONTROLS
"  10-03-92  JLUINITIAL DESIGN

MODULE HBUF1
TITLE 'WRITE BUFFER SYS SIDE CONTROLS'

20         "DESCRIPTION

"THIS PAL PROVIDES THE CONTROLS TO THE WRITE BUFFERS ON THE SYSTEM.

"DECLARATIONS

"DEFINE DEVICE
```

-40-

APPENDIX "A"

HBUF1          DEVICE 'P22V10';

"DEFINE INPUTS

CLKSYS      PIN 1;    "(2)  33 MHZ CLOCK INPUT
    WBS0        PIN 2;    "(3)  WB STATE BIT
    WBS1        PIN 3;    "(4)  WB STATE BIT
    WBS2        PIN 4;    "(5)  WB STATE BIT
    WBS3        PIN 5;    "(6)  WB STATE BIT
    DW0_        PIN 6;    "(7)  HADS STATE BIT
    DW1_        PIN 7;    "(9)  HADS STATE BIT
    1HHLDA      PIN 8;    "(10) HOLD ACK
    RDYIN_      PIN 9;    "(11) SYSTEM RDY
    BYPEND_     PIN 10;   "(12) BYPASS PENDING
    BOFF_       PIN 11;   "(13) BOFF
    RESET       PIN 13;   "(16) SYSTEM RESET
    1RDF3_      PIN 23;   "(27) READ FIFO 3

GND         PIN 12;   "(14) GND PIN

"DEFINE OUTPUTS

RESETREG    PIN 14;   "(17)
    DCOE_       PIN 15;   "(18) DATA CHIP CPU SIDE OE
    2HMA2       PIN 16;   "(19) EARLY MA2
    ABYPASS_    PIN 17;   "(20) ADDRESS CHIP BYPASS
    DBYPASS_    PIN 18;   "(21) DATA CHIPS BYPASS
    C64PEND_    PIN 19;   "(23) 64BIT PENDING
    RDMA2       PIN 20;   "(24)

-41-

APPENDIX "A"

```
INIT        PIN 21; "(25)
WBRD        PIN 22; "(26) WB READ SIGNAL, NON TRISTATE

VCC         PIN 24; "(28) VCC PIN

"DEFINE CONSTANTS

H,L,X,Z,C,T,F  =1,0,.X.,.Z.,.C.,1,0;

STIDLE   = (!WBS3 & !WBS2 & !WBS1 & !WBS0);
STR2     = (!WBS3 & !WBS2 & !WBS1 &  WBS0);
STW1     = (!WBS3 & !WBS2 &  WBS1 & !WBS0);
STR4     = (!WBS3 & !WBS2 &  WBS1 &  WBS0);
1STRB1   = (!WBS3 &  WBS2 & !WBS1 & !WBS0);
STR6     = (!WBS3 &  WBS2 & !WBS1 &  WBS0);
STWB1    = (!WBS3 &  WBS2 &  WBS1 & !WBS0);
STR8     = (!WBS3 &  WBS2 &  WBS1 &  WBS0);
STWB2    = ( WBS3 & !WBS2 & !WBS1 & !WBS0);
1STRB2   = ( WBS3 & !WBS2 & !WBS1 &  WBS0);
STW2     = ( WBS3 & !WBS2 &  WBS1 & !WBS0);
STR1     = ( WBS3 & !WBS2 &  WBS1 &  WBS0);
STR3     = ( WBS3 &  WBS2 & !WBS1 & !WBS0);
STR5     = ( WBS3 &  WBS2 & !WBS1 &  WBS0);
2STR7    = ( WBS3 &  WBS2 &  WBS1 & !WBS0);
STG1     = ( WBS3 &  WBS2 &  WBS1 &  WBS0);

"STHIDLE = ( HS1 & !HS0 );
"STH0    = ( !HS1 & !HS0 );
```

APPENDIX "A"

```
"STH1      =   ( !HS1 &  HS0 );
"STB1      =   (  HS1 &  HS0 );

RDY            = !RDYIN_;

EQUATIONS

RESETREG  := RESET;

!DCOE_    := STR2 # STR4 # STR6 # STR8
             # STRB1 # STRB2;"DATACHIP CPU OE ON READ

EMA2           = WBS3 # RDMA2;
EMA2.OE   = !HHLDA;

1RDMA2    := !RDYIN_ & !RDMA2 & (STR2 # STR4 # STR6 # STR8)
             # STRB2
             # RDYIN_ & RDMA2 & (STR2 # STR4 # STR6 # STR8);

!C64PEND_ := !DW1_ & !DW0_ & !RDF3_ & C64PEND_"
                   & (STW1 # STW2) & !RESET"FIFO CYCLE
15           # !DW1_ & !DW0_ & (STWB1 # STRB1) & !RESET"BYPASS CYCLE
             # !C64PEND_ & RDYIN_ & !RESET & !STIDLE;"CLEAR ON READY

!ABYPASS_ = RESETREG
            # !BOFF_
            # STWB1 # STWB2 # STRB1 # STRB2;
```

-43-

APPENDIX "A"

```
DBYPASS_    = STIDLE # STW1 # STW2;

INIT        := !RESET & RESETREG;

!WBRD       := STIDLE # STW1 # STW2 # STWB1 # STWB2;

END HBUF1
```

APPENDIX "A"

```
"HCONT, U1, 40CB, 22V10-7
"         REVISION HISTORY
"
" 05-12-93  JLUREG HHLDA, HEADS DRIVES MALE
" 03-05-93  JLUBELUMAN
" 02-05-93  JLUDATALTCH FIX, RESYNC CLK WITH 22V10
" 01-17-93  JLUNEW STATES
" 01-11-93  JLUADD DBRDY IN STR7 FOR TBLAST
" 01-07-93  JLUHADS IN H0 STATE DURING READ
" 12-21-92  JLUDATALTCH
" 12-07-92  JLUFIX HADS OE
" 12-05-92  JLUMOVE DATALTCH, TBLAST IN
" 10-03-92  JLUINITIAL DESIGN

MODULE HCONT
TITLE 'SYSTEM SIDE CONTROLS'

"DESCRIPTION

"THIS PAL PROVIDES THE CONTROLS TO THE SYSTEM.

"DECLARATIONS

"DEFINE DEVICE
HCONT       DEVICE 'P22V10';

"DEFINE INPUTS
CLK33       PIN 1;  "(2)  33 MHZ CLOCK INPUT
```

APPENDIX "A"

```
WBS0        PIN 2;   "(3)  STATE BIT
WBS1        PIN 3;   "(4)  STATE BIT
WBS2        PIN 4;   "(5)  STATE BIT
WBS3        PIN 5;   "(6)  STATE BIT
HS0         PIN 6;   "(7)  STATE BIT
HS1         PIN 7;   "(9)  STATE BIT
RDYIN_      PIN 8;   "(10) SYSTEM RDY
BS16REG_    PIN 9;   "(11) REGISTER BS16
PHASE       PIN 10;  "(12) PHASE
1HBOFF_     PIN 11;  "(13) HOST BOFF
HOLD        PIN 13;  "(16) HOLD
RSTCPU_     PIN 14;  "(17) RSTCPU
HEADS_      PIN 23;  "(27) HOST EADS_

1GND        PIN 12;  "(14) GND PIN

"DEFINE OUTPUTS

XX          PIN 15;  "(18)
HADS_       PIN 16;  "(19) HOST ADS
MALE_       PIN 17;  "(20) TRANE BLAST
2HAOE_      PIN 18;  "(21) HOST T2
XXXX        PIN 19;  "(23)
HHLDA       PIN 20;  "(24) HOLD ACKNOLEDGE
HDOE_       PIN 21;  "(25) DATALATCH FOR TRANE
BS16CLK     PIN 22;  "(26) RDYIN TO DATA CHIPS

2VCC        PIN 24;  "(28) VCC PIN
```

-46-

APPENDIX "A"

APPENDIX "A"

"DEFINE CONSTANTS

H,L,X,Z,C,T,F   =   1,0,.X.,.Z.,.C.,1,0;

STIDLE    =   (!WBS3 & !WBS2 & !WBS1 & !WBS0);
STR2      =   (!WBS3 & !WBS2 & !WBS1 &  WBS0);
STW1      =   (!WBS3 & !WBS2 &  WBS1 & !WBS0);
STR4      =   (!WBS3 & !WBS2 &  WBS1 &  WBS0);
STRB1     =   (!WBS3 &  WBS2 & !WBS1 & !WBS0);
STR6      =   (!WBS3 &  WBS2 & !WBS1 &  WBS0);
STWB1     =   (!WBS3 &  WBS2 &  WBS1 & !WBS0);
1STR8     =   (!WBS3 &  WBS2 &  WBS1 &  WBS0);
STWB2     =   ( WBS3 & !WBS2 & !WBS1 & !WBS0);
STRB2     =   ( WBS3 & !WBS2 & !WBS1 &  WBS0);
STW2      =   ( WBS3 & !WBS2 &  WBS1 & !WBS0);
STR1      =   ( WBS3 & !WBS2 &  WBS1 &  WBS0);
1STR3     =   ( WBS3 &  WBS2 & !WBS1 & !WBS0);
STR5      =   ( WBS3 &  WBS2 & !WBS1 &  WBS0);
STR7      =   ( WBS3 &  WBS2 &  WBS1 & !WBS0);
STG1      =   ( WBS3 &  WBS2 &  WBS1 &  WBS0);

"STHIDLE  =   (  HS1 & !HS0 );
2"STH0    =   ( !HS1 & !HS0 );
"STH1     =   ( !HS1 &  HS0 );
"STB1     =   (  HS1 &  HS0 );

EQUATIONS

-48-

APPENDIX "A"

```
!HADS_    = STH1;

HADS_.OE  = !HHLDA;

MALE_     = HEADS_    "LOW DURING HEADS_ ACTIVE
            #  !RSTCPU_;   "HIGH DURING RESET

HAOE_     = HHLDA & HOLD_;

HHLDA    := HOLD & STIDLE & RSTCPU_;   "GIVES HHLDA ONLY AT IDLE STATE

HDOE_    := HOLD & STIDLE & RSTCPU_;   "GIVES HHLDA ONLY AT IDLE STATE

BS16CLK   = RSTCPU_;

END HCONT
```

APPENDIX "A"

```
"HRDY, U9, 3DAC, 20R4-5
"         REVISION HISTORY
"
" 04-02-93  JLUTAKE OUT HRDY AND HBRDY
" 03-18-93  JLUADD RD BYPASS STATES TO CDTWE
" 03-05-93  JLUBELUMAN

MODULE HRDY
TITLE 'SYSTEM SIDE CONTROLS'

"DESCRIPTION

"THIS PAL GATES ALL READYS TO THE BOARD

"DECLARATIONS

"DEFINE DEVICE
HRDY            DEVICE 'P20R4';

"DEFINE INPUTS
CLK33           PIN 1;   "(2)  33 MHZ CLOCK INPUT
WBS0            PIN 2;   "(3)  STATE BIT
WBS1            PIN 3;   "(4)  STATE BIT
WBS2            PIN 4;   "(5)  STATE BIT
WBS3            PIN 5;   "(6)  STATE BIT
HS0             PIN 6;   "(7)  STATE BIT
HS1             PIN 7;   "(9)  STATE BIT
VBRDY_          PIN 8;   "(10) VESA BUS BRDY
```

-50-

APPENDIX "A"

```
DBRDY_       PIN 9;    "(11) TRANE BRDY
LRDY_        PIN 10;   "(12) LOCAL BUS RDY
EBCRDY_      PIN 11;   "(13) EBC RDY
OE_          PIN 13;   "(16) OE
PHASE        PIN 14;   "(17) PHASE
BS16REG_     PIN 15;   "(18) REG BS16
HBRDY_       PIN 22;   "(26) HOST BRDY
HRDY_        PIN 23;   "(27) HOST RDY

GND          PIN 12;   "(14) GND PIN

10           "DEFINE OUTPUTS

XXXX         PIN 16;   "(19)
TBLAST_      PIN 17;   "(20) TRANE BLAST
XXX          PIN 18;   "(21)
CDTWE_       PIN 19;   "(23) WE TAG ON CACHE DESCRIPTOR
1XX          PIN 20;   "(24)
RDYIN_       PIN 21;   "(25) SUM OF RDY

VCC          PIN 24;   "(28) VCC PIN

"DEFINE CONSTANTS
20

H,L,X,Z,C,T,F  =  1,0,.X.,.Z.,.C.,1,0;

STIDLE    =   (!WBS3 & !WBS2 & !WBS1 & !WBS0);
STR2      =   (!WBS3 & !WBS2 & !WBS1 &  WBS0);
```

-51-

APPENDIX "A"

```
STW1      = (!WBS3 & !WBS2 &  WBS1 & !WBS0);
STR4      = (!WBS3 & !WBS2 &  WBS1 &  WBS0);
STRB1     = (!WBS3 &  WBS2 & !WBS1 & !WBS0);
STR6      = (!WBS3 &  WBS2 & !WBS1 &  WBS0);
STWB1     = (!WBS3 &  WBS2 &  WBS1 & !WBS0);
STR8      = (!WBS3 &  WBS2 &  WBS1 &  WBS0);
STWB2     = ( WBS3 & !WBS2 & !WBS1 & !WBS0);
STRB2     = ( WBS3 & !WBS2 & !WBS1 &  WBS0);
STW2      = ( WBS3 & !WBS2 &  WBS1 & !WBS0);
STR1      = ( WBS3 & !WBS2 &  WBS1 &  WBS0);
STR3      = ( WBS3 &  WBS2 & !WBS1 & !WBS0);
STR5      = ( WBS3 &  WBS2 & !WBS1 &  WBS0);
STR7      = ( WBS3 &  WBS2 &  WBS1 & !WBS0);
STG1      = ( WBS3 &  WBS2 &  WBS1 &  WBS0);

STHIDLE   = (  HS1 & !HS0 );
 STH0     = ( !HS1 & !HS0 );
 STH1     = ( !HS1 &  HS0 );
 STB1     = (  HS1 &  HS0 );
```

EQUATIONS

```
RDYIN_    =     "  !HRDY_ # !HBRDY_
                  !VBRDY_ # !DBRDY_"BRDY
                # !LRDY_  # !EBCRDY_;"RDY

!CDTWE_   := (STR2 # STRB1 # STRB2) & !HBRDY_;
```

-52-

APPENDIX "A"

```
TBLAST_  := STR2 & !TBLAST_
         # TBLAST_ & !(STR8 & (!HRDY_ # !HBRDY_)) & !STIDLE;

END HRDY
```

APPENDIX "A"

```
"HSM, U2, 88B9, 22V10-7DELL CONFIDENTIAL
"DATE     CHKSUM WHO  DESCRIPTION
"
" 03/05/93       JLUBELUMAN
5 01/28/93       JLUNO CDTWE ON EBC RDY
" 01/22/93       JLUFIX 64BIT WR CYCLE
" 01/19/93       JLUCHANGE CDTWE TO STR2
" 01/17/93       JLUADD RDY32, DROP 4 STATES TO COMPILE
" 01/15/93       JLUSTATE W2, WB2, RB2 FOR MA2=1, ADD DW0_, DW1_
10 01/11/93      JLUHRDYI FOR LINE FILL READ
" 01/06/93       JLUADD CDTWE
" 12/21/92       JLUFIX POK, CFILL AT RB1
" 12/07/92       JLUADD WBWR. FIXED OE
" 12/05/92       JLUHADS STATE BACK IN. WBRDY
15 12/04/92      JLU64-BIT PENDING BIT, BYPASS STATES
" 10/11/92       JLUINITIAL VERSION. MAIN TRACKER FOR SYSTEM OPERATIONS

MODULE HSM FLAG '-R3','-T4','-W1,8,2,4,9,6,7,5,3,14,15,16,19,18,17,12,13'
TITLE 'WRITE BUFFER HOST MACHINE'

" DESCRIPTION: THIS PAL CONTROLS WRTE BUFFERS CYCLES
20

" DECLARATIONS

" DEFINE DEVICE
HSM       DEVICE 'P22V10';
```

APPENDIX "A"

" DEFINE INPUTS

```
CLK33       PIN 1;   "(2)  CLK33
RSTCPU_     PIN 2;   "(3)  SYTEM RSTCPU_
RDYIN_      PIN 3;   "(4)  HOST COMBINE RDY
WR          PIN 4;   "(5)  WR
BYPEND_     PIN 5;   "(6)  BYPASS CYCLE PENDING
F3EREG      PIN 6;   "(7)  EMPTY FLAG FOR FIFO
HOLD        PIN 7;   "(9)  HOLD REQUEST
HBRDY_      PIN 8;   "(10) HOST BRDY
1CFILL      PIN 9;   "(11) CACHE LINE FILL
C64PEND_    PIN 10;  "(12) 64BIT PENDING
BS16REG_    PIN 11;  "(13) 16BIT CYCLE REQUEST
DW0_        PIN 13;  "(16) LOW DWORD VALID
DW1_        PIN 14;  "(17) HI  DWORD VALID

1GND        PIN 12;  "(14) GROUND
```

"DEFINE OUTPUTS

```
WBRDY       PIN 15;  "(18) WRITE BUFFER READY STATES
WBS3        PIN 16;  "(19) STATE BIT
WBS2        PIN 17;  "(20) STATE BIT
2HS1        PIN 18;  "(21) STATE BIT
WBS1        PIN 19;  "(23) STATE BIT
WBS0        PIN 20;  "(24) STATE BIT
HS0         PIN 21;  "(25) STATE BIT
BS16PEND    PIN 22;  "(26) BS16 CYCLE PENDING
```

-55-

APPENDIX "A"

```
RDY32          PIN 23;  "(27) 32BIT READY BIT

VCC            PIN 24;  "(28) POWER

"WBS0, WBS1, WBS2, WBS3 ISTYPE 'REG';
"HADS_, HS0 ISTYPE 'REG';

" DEFINE CONSTANTS

H,L,X,Z,C,T,F   =   1,0,.X.,.Z.,.C.,1,0;

IDLE           = ^H0;"0000
R2             = ^H1;"0001
W1             = ^H2;"0010
1R4            = ^H3;"0011
RB1            = ^H4;"0100
R6             = ^H5;"0101
WB1            = ^H6;"0110
R8             = ^H7;"0111
1WB2           = ^H8;"1000
RB2            = ^H9;"1001
W2             = ^HA;"1010
R1             = ^HB;"1011
R3             = ^HC;"1100
2R5            = ^HD;"1101
R7             = ^HE;"1110
G1             = ^HF;"1111
```

-56-

APPENDIX "A"

```
STIDLE    = (!WBS3 & !WBS2 & !WBS1 & !WBS0);
STR2      = (!WBS3 & !WBS2 & !WBS1 &  WBS0);
STW1      = (!WBS3 & !WBS2 &  WBS1 & !WBS0);
STR4      = (!WBS3 & !WBS2 &  WBS1 &  WBS0);
STRB1     = (!WBS3 &  WBS2 & !WBS1 & !WBS0);
STR6      = (!WBS3 &  WBS2 & !WBS1 &  WBS0);
STWB1     = (!WBS3 &  WBS2 &  WBS1 & !WBS0);
STR8      = (!WBS3 &  WBS2 &  WBS1 &  WBS0);
STWB2     = ( WBS3 & !WBS2 & !WBS1 & !WBS0);
STRB2     = ( WBS3 & !WBS2 & !WBS1 &  WBS0);
STW2      = ( WBS3 & !WBS2 &  WBS1 & !WBS0);
STR1      = ( WBS3 & !WBS2 &  WBS1 &  WBS0);
STR3      = ( WBS3 &  WBS2 & !WBS1 & !WBS0);
STR5      = ( WBS3 &  WBS2 & !WBS1 &  WBS0);
STR7      = ( WBS3 &  WBS2 &  WBS1 & !WBS0);
STG1      = ( WBS3 &  WBS2 &  WBS1 &  WBS0);

"STHIDLE  = ( HS1 & !HS0 );
"STH0     = (!HS1 & !HS0 );
"STH1     = (!HS1 &  HS0 );
STB1      = ( HS1 &  HS0 );

HIDLE     = ^H2;"10
H0        = ^H0;"00
H1        = ^H1;"01
B1        = ^H3;"11

WR64      = WR & !DW0_ & !DW1_;
```

APPENDIX "A"

```
"RD64     = !WR & !DW0_ & !DW1_;
"RD32     = !WR & (DW0_ # DW1_);

RDY       = !RDYIN_;

EQUATIONS $WBS3, WBS2, WBS1, WBS0, HS1, HS0].CLK = CLK33;

" [WBS3, WBS2, WBS1, WBS0, HS1, HS0, WBRDY].OE = !HSM_OE_;

WBRDY    :=  !RDYIN_ & RDY32 & (STR2 # STR4 # STR6 # STR8)
          #  !RDYIN_ & (STRB1 # STWB1) & C64PEND_
          #  !RDYIN_ & (STRB2 # STWB2);

1RDY32   :=  !RDYIN_ & !RDY32 & (STR2 # STR4 # STR6 # STR8)
          #  RDY32 & RDYIN_ & RSTCPU_;

BS16PEND :=  !RSTCPU_;

STATE_DIAGRAM  [WBS3, WBS2, WBS1, WBS0]

STATE IDLE:
15       IF !RSTCPU_ THEN IDLE
            ELSE IF (!HOLD & !F3EREG) THEN W1"MEMWR
               ELSE IF (!HOLD & WR & BYPEND_) THEN WB1"BYPASS WRITES
                  ELSE IF (!HOLD & !WR & !BYPEND_) THEN RB1"READS
                     ELSE IDLE;
```

-58-

APPENDIX "A"

STATE W1:

```
        IF !RSTCPU_ THEN IDLE
            ELSE IF (!DW1_ & DW0_ & STH0"HIGH 32 CYCLE
                #RDY & !C64PEND_) THEN W2"64BIT PENDING
5           ELSE IF (RDY & (HOLD # F3EREG)) THEN IDLE"RETURN ON EMPTY/HOLD
            ELSE IF (RDY & !DW1_ & DW0_) THEN W2"CONT TO EMPTY FIFO
                ELSE W1;
```

STATE W2:

```
        IF !RSTCPU_ THEN IDLE
10      ELSE IF (RDY & (HOLD # F3EREG)) THEN IDLE"RETURN ON EMPTY
            ELSE IF (RDY & !DW0_) THEN W1"CONT TO EMPTY FIFO
                ELSE W2;
```

STATE WB1:

```
        IF !RSTCPU_ THEN IDLE
15      ELSE IF (STH0 & !DW1_ & DW0_
                # RDY & !C64PEND_) THEN WB2"64BIT PENDING
            ELSE IF (RDY) THEN IDLE"RETURN ON RDY
                ELSE WB1;
```

STATE WB2:

```
20      IF !RSTCPU_ THEN IDLE
            ELSE IF (RDY) THEN IDLE"RETURN ON RDY
                ELSE WB2;
```

STATE RB1:

```
        IF !RSTCPU_ THEN IDLE
```

-59-

APPENDIX "A"

```
            ELSE IF (CFILL & STB1) THEN R2"LINE FILL
            ELSE IF (STH0 & !DW1_ & DW0_
                # RDY & !C64PEND_) THEN RB2"64BIT PENDING
              ELSE IF (RDY) THEN IDLE"RETURN ON RDY
 5             ELSE RB1;

STATE RB2:
            IF !RSTCPU_ THEN IDLE
              ELSE IF (CFILL & STB1) THEN R2"LINE FILL
                ELSE IF (RDY) THEN IDLE"RETURN ON RDY
10                 ELSE RB2;

STATE R1: GOTO IDLE;

STATE R2:
            IF !RSTCPU_ THEN IDLE
              ELSE IF (RDY & RDY32) THEN R4
15                 ELSE R2;

STATE R3: GOTO IDLE;

STATE R4:
            IF !RSTCPU_ THEN IDLE
              ELSE IF (RDY & RDY32) THEN R6
20                 ELSE R4;

STATE R5: GOTO IDLE;
```

-60-

APPENDIX "A"

```
STATE R6:
         IF !RSTCPU_ THEN IDLE
            ELSE IF (RDY & RDY32) THEN R8
               ELSE R6;

STATE R7: GOTO IDLE;

STATE R8:
         IF !RSTCPU_ THEN IDLE
            ELSE IF (RDY & RDY32) THEN IDLE
               ELSE R8;

1STATE G1: GOTO IDLE;

"HADS STATE MACHINE

STATE_DIAGRAM [HS1, HS0]

STATE HIDLE:
          IF (!RSTCPU_ # HOLD) THEN HIDLE
15           ELSE IF (!F3EREG # !BYPEND_) THEN H0
                ELSE HIDLE;

STATE H0: IF !RSTCPU_ THEN HIDLE
                  ELSE H1;

STATE H1: IF !RSTCPU_ THEN HIDLE
20                ELSE B1;
```

APPENDIX "A"

STATE B1:

```
    IF !RSTCPU_ THEN HIDLE
      ELSE IF (!RDY) THEN B1
        ELSE IF (!HBRDY_ & (STR2 # STR4 # STR6)
            # !HBRDY_ & STR8 & !RDY32) THEN B1
          ELSE IF (STR8 & RDY32 # STWB2 # STRB2) THEN HIDLE
            ELSE IF (STWB1 # STRB1) & C64PEND_ THEN HIDLE
              ELSE IF ((STW1 # STW2) & C64PEND_
              & (HOLD # F3EREG)) THEN HIDLE
                ELSE H1;
```

END HSM

What is claimed is:

1. A computer system, comprising:
   a central processing unit (CPU) capable of operating in real and virtual addressing modes;
   a memory unit, coupled to said CPU, having a particular attribute; and
   a mapping circuit, coupled to said CPU and said memory unit, capable of retrieving said attribute each time said CPU accesses said memory unit and storing said attribute in said mapping circuit, subsequent accesses by said CPU of said memory unit optimized by use of said stored attribute, said mapping circuit functional in said real and virtual addressing modes.

2. The system as recited in claim 1 wherein said mapping circuit comprises mapping random-access memory (RAM) for storing said attribute.

3. The system as recited in claim 2 wherein said mapping RAM is static RAM.

4. The system as recited in claim 1 further comprising a reset circuit for booting said computer system, said reset circuit erasing said attribute from said mapping circuit when said computer system is booted to thereby allow said mapping circuit to dynamically learn said attribute while said computer system functions.

5. The system as recited in claim 1 further comprising a write buffer coupled to said CPU and said memory unit, said write buffer retrieving said attribute from said mapping circuit when said CPU again accesses said memory unit, said write buffer using said attribute to increase efficiency of communication of data between said CPU and said memory unit.

6. The system as recited in claim 1 wherein said attribute corresponds to a memory unit of a predetermined minimum size.

7. The system as recited in claim 1 wherein said attribute pertains to a cacheability of said memory unit.

8. The system as recited in claim 1 wherein said attribute pertains to a writability of said memory unit.

9. The system as recited in claim 1 wherein said mapping circuit is located within said CPU.

10. A method of managing memory in a computer system, comprising the steps of:
    accessing a memory unit with a central processing unit (CPU) capable of operating in real and virtual addressing modes, said memory unit generating a signal representing a particular performance attribute of said memory unit each time said memory unit is accessed;
    receiving and storing said attribute in a memory-mapping circuit coupled to said CPU and said memory unit, said memory-mapping circuit functional in said real and virtual addressing modes; and
    retrieving said attribute from said circuit when said CPU subsequently accesses said memory unit, said retrieved attribute used to optimize said subsequent access.

11. The method as recited in claim 10 wherein said mapping circuit comprises mapping random-access memory (RAM) for storing said attribute.

12. The method as recited in claim 11 wherein said mapping RAM is static RAM.

13. The method as recited in claim 10 further comprising the step of booting said computer system, said booting erasing said attribute from said mapping circuit to thereby allow said mapping circuit to dynamically learn said attribute while said computer system functions.

14. The method as recited in claim 10 further comprising the step of retrieving said attribute from said mapping circuit with a write buffer when said CPU again accesses said memory unit, said write buffer using said attribute to increase efficiency of communication of data between said CPU and said memory unit.

15. The method as recited in claim 10 wherein said attribute corresponds to a memory unit of a predetermined minimum size.

16. The method as recited in claim 10 wherein said attribute pertains to a cacheability of said memory unit.

17. The method as recited in claim 10 wherein said memory mapping circuit is within said CPU.

18. A computer system, comprising:
    a central processing unit (CPU) capable of operating in real and virtual addressing modes;
    memory units coupled to said CPU via address and data buses, said memory units having corresponding attributes relating to performance of the memory units;
    a memory controller configured to generate signals representing said performance attributes each time said CPU accesses said corresponding memory units;
    a memory-mapping circuit including mapping random-access memory (RAM) and capable of receiving and storing said signal in a location within said mapping RAM corresponding to an addressable location of said memory unit, said memory-mapping circuit learning performance attributes as successive ones of said memory units are accessed and building, within said mapping RAM, a performance attribute map of said memory units, said memory-mapping circuit functional in said real and virtual addressing modes; and
    a write buffer, coupled to said address and data buses, capable of controlling communication of data between said CPU and said memory units and capable of retrieving said performance attributes from said map to optimize said communication, operation of said CPU and said memory units being independent of operation of said memory-mapping circuit and said write buffer.

19. The system as recited in claim 18 wherein said mapping RAM is static RAM.

20. The system as recited in claim 18 further comprising a reset circuit for booting said computer system, said reset circuit erasing said performance attributes from said mapping RAM when said computer system is booted to thereby allow said mapping RAM to dynamically learn said performance attributes while said computer system functions.

21. The system as recited in claim 18 further comprising a write buffer coupled to said CPU and said memory unit, said write buffer retrieving said attribute from said memory-mapping circuit when said CPU again accesses said memory unit, said write buffer using said attribute to increase efficiency of communication of data between said CPU and said memory unit.

22. The system as recited in claim 18 wherein said attribute corresponds to a memory unit of a predetermined minimum size.

23. The system as recited in claim 22 wherein said predetermined minimum size is 16 kilobytes.

24. The system as recited in claim 18 wherein said attribute pertains to a cacheability of said memory unit.

25. The system as recited in claim 18 wherein said attribute pertains to a writability of said memory unit.

26. The system as recited in claim 18 wherein said memory-mapping circuit is within said CPU.

27. A method of operating a computer system, comprising the steps of:
    addressing a location within a memory unit with a central processing unit (CPU) capable of operating in real and virtual addressing modes, said memory unit having a particular attribute relating to operation of said memory unit;

establishing a path for communication of data between said CPU and said location with a memory controller, said memory controller developing a signal representing said attribute;

receiving said attribute into a memory-mapping circuit coupled to said memory controller, said memory-mapping circuit fuctional in said real and virtual addressing modes;

storing said attribute in an attribute map within said memory-mapping circuit, said attribute map becoming more complete as said CPU addresses other memory units within said computer system;

retrieving said attribute from said attribute map into a write buffer when said CPU again addresses said memory unit, said write buffer using said attribute to increase efficiency of communication between said CPU and said memory unit independent of operation of said CPU and memory unit; and erasing said attribute map when said computer system is booted to thereby allow said memory-mapping circuit to dynamically learn said attribute map while said computer system functions.

28. The method as recited in claim 27 wherein attribute map is stored in mapping RAM within said memory-mapping circuit.

29. The method as recited in claim 28 wherein said mapping RAM is static RAM.

30. The method as recited in claim 27 wherein said attribute corresponds to a memory unit of a predetermined minimum size.

31. The method as recited in claim 27 wherein said predetermined minimum size is 16 kilobytes.

32. The method as recited in claim 27 wherein said attribute pertains to a cacheability of said memory unit.

33. The method as recited in claim 27 wherein said attribute pertains to a writability of said memory unit.

34. The method as recited in claim 27 wherein said memory-mapping circuit is within said CPU.

* * * * *